United States Patent
Hattori et al.

(10) Patent No.: US 6,803,537 B2
(45) Date of Patent: Oct. 12, 2004

(54) WIRE ELECTRIC DISCHARGE MACHINE INCLUDING PROFILE ADJUSTING MECHANISM

(75) Inventors: Kouichirou Hattori, Tokyo (JP); Tatsushi Satou, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/311,228

(22) PCT Filed: Nov. 27, 2001

(86) PCT No.: PCT/JP01/10326

§ 371 (c)(1),
(2), (4) Date: Dec. 16, 2002

(87) PCT Pub. No.: WO03/045614

PCT Pub. Date: Jun. 5, 2003

(65) Prior Publication Data

US 2004/0011767 A1 Jan. 22, 2004

(51) Int. Cl.[7] .............................. B23H 7/02; B23H 7/04
(52) U.S. Cl. .................................................. 219/69.12
(58) Field of Search ....................................... 219/69.12

(56) References Cited

U.S. PATENT DOCUMENTS 5,185,507 A    2/1993   Yasui

FOREIGN PATENT DOCUMENTS

| JP | 61-121829 A | * | 6/1986 |
| JP | 4-189421 | | 7/1992 |
| JP | 11-826 A | * | 1/1999 |
| WO | WO-03/037558 A1 | * | 5/2003 |

* cited by examiner

*Primary Examiner*—Geoffrey S. Evans
(74) *Attorney, Agent, or Firm*—Sughrue Mion, PLLC

(57) ABSTRACT

A wire electrical discharge machine in which a profile directing unit controls a profile of a portion in the neighborhood of an approach point, which connects an approach path portion with a machining profile portion of the relative movement path of the wire electrode and workpiece on a machined face of the workpiece. A profile of a portion in the neighborhood of the approach point on the machined face of the workpieces can be adjusted to a desired profile according to the use of the workpiece.

8 Claims, 6 Drawing Sheets

| INDICATING VALUE | -3 | -2 | -1 | 0 | +1 | +2 | +3 |
|---|---|---|---|---|---|---|---|
| H | 1.6 | 1.4 | 1.2 | 1 | 0.8 | 0.6 | 0.4 |

| INDICATING VALUE | -3 | -2 | -1 | 0 | +1 | +2 | +3 |
|---|---|---|---|---|---|---|---|
| H | 0.4 | 0.6 | 0.8 | 1 | 1.2 | 1.4 | 1.6 |

US 6,803,537 B2

WIRE ELECTRIC DISCHARGE MACHINE INCLUDING PROFILE ADJUSTING MECHANISM

This application is a 371 of PCT/JP01/10326, filed Nov. 27, 2001.

TECHNICAL FIELD

The present invention relates to improvements in a wire electric discharge machine to conduct machining on a workpiece when electric power for machining is supplied between an electrode and the workpiece.

BACKGROUND ART

First of all, the formation of a recess portion on a machined face of a workpiece by electric discharge machining will be explained below. FIG. 6 is a schematic illustration showing a relative movement path, which will be referred to as an electrode path in this specification hereinafter, formed between a wire electrode and workpiece in the case of wire electric discharge machining. In the drawing, reference numeral 1 is a workpiece, reference numeral 2 is a machined profile portion of an electrode path to be machined to an objective profile (This machined profile portion of the electrode path will be referred to as a profile portion in this specification hereinafter.), reference numeral 3 is a point at which a machining start hole is formed (This point will be referred to as a machining start point in this specification hereinafter.), reference numeral 4 is an approach path portion of the electrode path formed from the machining start point 3 to the profile portion 2 (This approach path portion will be referred to as an approach portion in this specification hereinafter.), and reference mark O is a connection point of the profile portion 2 with the approach portion 4 (This connection point will be referred to as an approach point in this specification hereinafter.). FIG. 7 is an enlarged view of the neighborhood of approach point O shown in FIG. 6. Like reference characters are used to indicate like parts in FIGS. 6 and 7. In FIG. 7, reference numeral 5 is a wire electrode, and reference numeral 6 is a recess portion.

As well known, wire electric discharge machining is a method of machining in which the wire electrode 5 is used as if it were a fretsaw to cut out the workpiece 1. In the process of wire electric discharge machining, not only the profile portion 2 but also the approach portion 4 is machined as shown in FIG. 6.

In the profile portion 2 of usual wire electric discharge machining, consideration must be given to a radius of the wire electrode 5, electric discharge gap and allowance necessary for finishing. Therefore, a path is set which is distant from the profile to be machined by a predetermined distance which is referred to as an offset, and electric discharge machining is conducted when the center of the wire electrode 5 is moved along this offset path. As shown in FIG. 7, the wire electrode 5 starts at the machining start point 3 and passes through the approach portion 4 and then moves from approach point O to the profile portion 2 and makes a round of the profile portion 2 and then returns to the machining start point 3 via the approach point O and the approach portion 4.

When the wire electrode 5 moves as described above and makes a round of the profile portion 2, the wire electrode 5 passes through the profile portion 2 only once except for approach point O, that is, the wire electrode 5 passes through only approach point O twice. When the electrode 5 passes through approach point O for the second time, the portion of the workpiece 1 to be removed has already been removed. Therefore, when the electrode 5 passes through approach point O for the second time, electric discharge is generated on the face which has already been machined, and overcutting is caused on the machined face. Accordingly, the recess portion 6 is formed in the neighborhood of approach point O on the machined face of the workpiece 1.

In the case of conducting wire electric discharge machining on a workpiece so as to make a metallic mold for resin molding, resin molding is conducted with the metallic mold by transferring the profile formed by electric discharge machining. Therefore, when the recess portion 6 exists on the machined face of the metallic mold which is machined as a workpiece of wire electric discharge machining, an unexpected pattern is formed on a resin product made by this metallic mold. In order to solve this problem, it is necessary to form a uniform profile of the metallic mold having no recess portion 6. Therefore, it is necessary to remove the recess portion 6, which has been formed on the machine face of the workpiece as shown in FIG. 7, by after-machining such as wire electric discharge machining. In this case, it is necessary to remove the entire volume of a hatched portion in FIG. 8 from the workpiece 1.

As a method of suppressing the generation of the recess portion 6, Japanese Unexamined Patent Publication No. 4-189421 discloses a wire electric discharge machining method. According to this method, as shown in FIG. 9, the first approach point OA and the second approach point OB are set on the profile portion 2, and the approach path is connected with these two approach points, that is, the approach portions 4A and 4B are connected with these two approach points, and the electric discharge machining program is changed so that an electrode path in the profile portion between approach points OA and OB in FIG. 9 can be deleted. In this way, the electrode path is changed as shown in FIG. 9.

Further, as a method of suppressing the generation of the recess portion 6, International Patent Application No. PCT/JP01/09577 discloses an invention. According to this invention, two approach points are not set, and the electrode path is formed in the same manner as that shown in FIG. 7. When a distance between approach point O, at which the approach portion 4 and the profile portion 2 of the electrode path are connected with each other, and the center of the wire electrode 5 in the profile portion 2 is in a range in which a machining volume of the workpiece 1 per unit moving distance of the wire electrode 5 is decreased, electric discharge machining is conducted when an intensity of energy of machining per unit moving distance of the wire electrode 5 is decreased.

In the case where the workpiece is a metallic mold used for resin forming, when the recess portion 6 shown in FIG. 7 is not formed but the protruding portion 7 shown in FIG. 10 is formed, it is unnecessary to remove the entire volume of a hatched portion in FIG. 8, that is, only the protruding portion 7 shown in FIG. 10 may be removed. Therefore, the time required for after-machining can be greatly reduced. In this way, the profile of a portion in the neighborhood of approach point O of the workpiece 1 may be positively formed into a protrusion in some cases.

In the case where the workpiece is a metallic die used for press forming, if the protruding portion 7 shown in FIG. 10 is formed in the neighborhood of approach point O of the workpiece 1, the protruding portion 7 collides with the punch in the process of press forming and the metallic die is damaged. Therefore, it is necessary to remove the protruding portion 7, however, in the case of a metallic die used for press forming in which after-machining is unnecessary, a recess portion like the recess portion 6 shown in FIG. 7 may exist.

The invention disclosed in Japanese Unexamined Patent Publication No. 4-189421 and the invention disclosed in International Patent Application No. PCT/JP01/09577 have a predetermined effect to suppress the formation of the recess portion 6 described above, however, it is impossible to desirably adjust the profile of a portion in the neighborhood of the approach point on a machined face of a workpiece.

DISCLOSURE OF INVENTION

The present invention has been accomplished to solve the above problems. It is an object of the present invention to provide a wire electric discharge machine capable of adjusting a profile of a portion in the neighborhood of an approach point on a machined face of a workpiece so that it can be formed into a desired profile.

The present invention provides a wire electric discharge machine in which a wire electrode and workpiece are relatively moved from each other by a drive means and energy for machining is supplied between the wire electrode and workpiece by a machining electric power supply means so that the workpiece is machined by electric discharge generated between the wire electrode and workpiece, the wire electric discharge machine comprising: a profile directing means for directing a profile of a portion in the neighborhood of an approach point, which connects an approach path portion with a machining profile portion of the relative movement path on a machined face of the workpiece, to be a desirable profile such as a protruding profile or recess profile according to the use of the workpiece; and an adjusting means for adjusting a profile of the portion in the neighborhood of the approach point according to the direction value directed by the profile directing means.

In the wire electric discharge machine of the present invention, the adjusting means is a machining energy adjusting coefficient setting means for increasing and decreasing energy for machining.

The present invention provides a wire electric discharge machine in which a wire electrode and workpiece are relatively moved from each other by a drive means and energy for machining is supplied between the wire electrode and workpiece by a machining electric power supply means so that the workpiece is machined by electric discharge generated between the wire electrode and workpiece, the wire electric discharge machine comprising: a machining energy adjusting means for suppressing the formation of a recess portion in the neighborhood of the approach point on the machined face of the workpiece by reducing an intensity of machining energy per unit moving distance of the wire electrode when a distance between the approach point, at which the approach path portion and the machining profile portion of the electrode path are connected with each other, and the center of the wire electrode in the machining profile portion is in a range in which a machining volume of the workpiece per unit moving distance of the wire electrode is decreased; a profile directing means for directing a profile of a portion in the neighborhood of an approach point on the machined face of the workpiece to be a desirable profile such as a protruding profile or recess profile according to the use of the workpiece; and a machining energy adjusting coefficient setting means for adjusting a profile of a portion in the neighborhood of the approach point on the machined face of the workpiece according to a direction value directed by the profile directing means, wherein when a machining energy setting value of the machining energy adjusting means for suppressing the formation of a recess portion in the neighborhood of the approach point on the machined face of the workpiece is increased and decreased by the machining energy adjusting coefficient setting means, a desired protruding profile or recess profile is formed in a portion in the neighborhood of the approach point on the machined face of the workpiece.

The present invention provides a wire electric discharge machine in which a wire electrode and workpiece are relatively moved from each other by a drive means and two different approach points (a first approach point and a second approach point) to connect an approach path portion with a machining profile portion of the relative moving path are set and a portion of the relative moving path of the machining profile portion between the two approach points is deleted so that electric discharge machining is conducted on a machining profile portion of the relative moving path from the first approach point to the second approach point, the wire electric discharge machine comprising: a profile directing means for directing a profile of a portion in the neighborhood of an approach point to be a desirable profile such as a protruding profile or recess profile according to the use of a workpiece; and an approach point interval adjusting means for adjusting an interval between the first approach point and the second approach point according to a direction value given by the profile directing means.

Since the wire electric discharge machine of the present invention is composed as described above, it is possible to provide an effect that a profile of a portion in the neighborhood of an approach point on a machined face of a workpiece can be adjusted to be a desired profile according to the use of a workpiece.

BEST MODE FOR CARRYING OUT THE INVENTION

Embodiment 1

Figure 1:
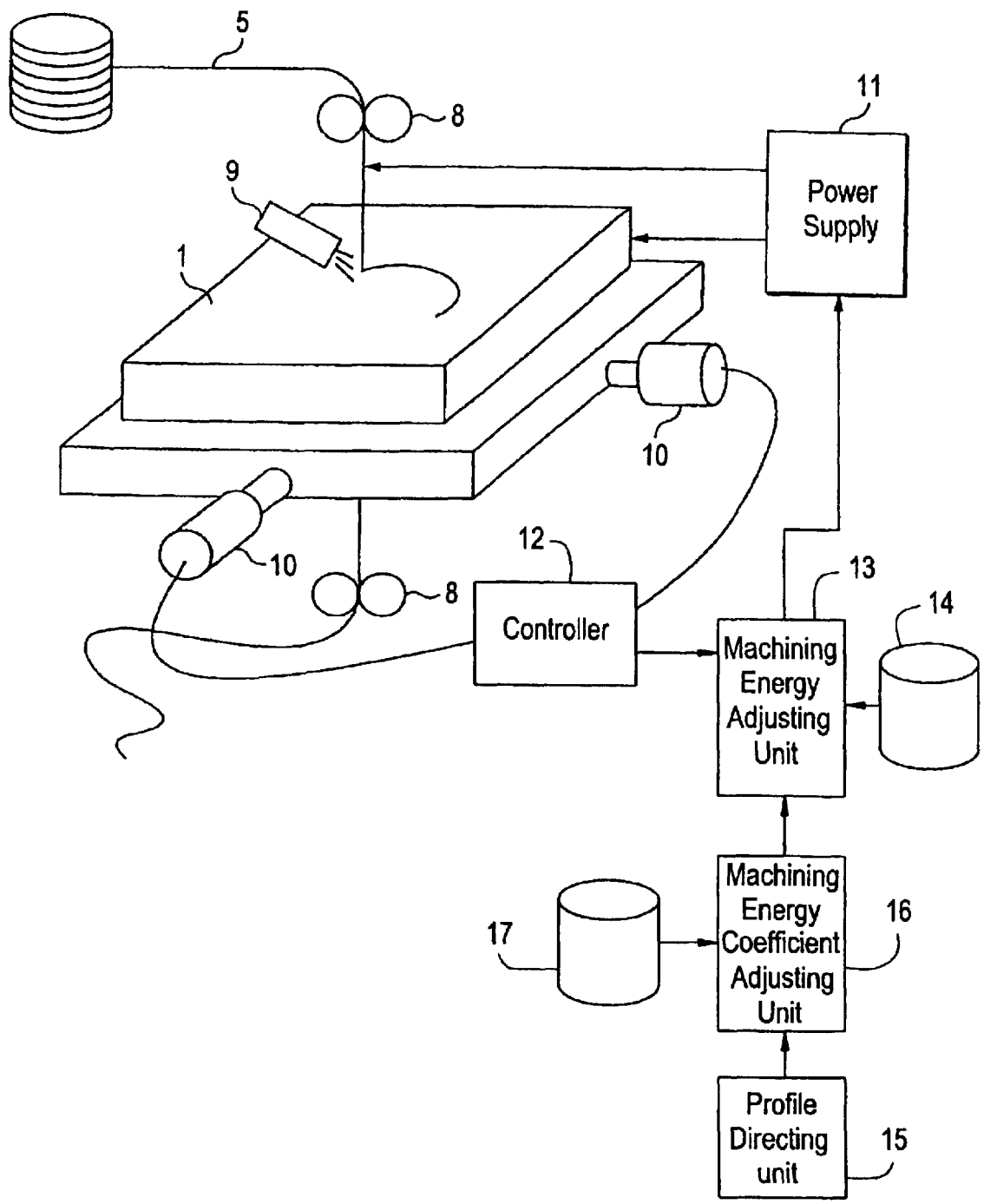
FIG. 1 is a schematic illustration showing an arrangement of a wire electric discharge machine of Embodiment 1 of the present invention.

FIG. 1 is a schematic illustration showing an arrangement of a wire electric discharge machine of Embodiment 1 of the present invention. In the drawing, reference numeral 1 is a workpiece, reference numeral 5 is a wire electrode, reference numeral 8 is a wire electrode supply means, reference numeral 9 is a machining solution supply means, reference numeral 10 is a drive means, reference numeral 11 is a machining electric power supply means, reference numeral 12 is a control means, reference numeral 13 is a machining energy adjusting means, reference numeral 14 is a machining energy inputting ratio table, reference numeral 15 is a profile directing means for directing a profile of a portion in the neighborhood of an approach point on a machined face of the workpiece 1 to be a desirable profile such as a protruding profile or recess profile according to the use of the workpiece 1, reference numeral 16 is a machining energy adjusting coefficient setting means for adjusting a profile of a portion in the neighborhood of the approach point on the machined face of the workpiece 1 according to the direction value directed by the profile directing means 15, and reference numeral 17 is a machining energy adjusting coefficient conversion table.

In the same manner as that of the invention of International Patent Application No. PCT/JP01/09577, the wire electric discharge machine of Embodiment 1 of the present invention as shown in FIG. 1 has a function of suppressing the formation of a recess portion on the machined face of the workpiece 1 by reducing machining energy when the wire electrode comes close to the approach point.

In FIG. 1, the wire electrode supply means 8 gives an appropriate intensity of tension to the wire electrode 5 while the wire electrode supply means 8 is letting out the wire electrode 5 and making it run at a predetermined speed. The machining solution supply means 9 supplied a machining solution between the wire electrode 5 and the workpiece 1. The machining electric power supply means 11 impresses a pulse-shaped voltage between the electrodes so that electric discharge can be generated.

The machining energy adjusting means 13 recognizes a position of the approach point at which the setting of offset is released from the program describing an electrode path, which is accommodated in the control unit 12, according to the setting information of offset. The machining energy adjusting means 13 has the following function. A distance between the coordinate of an approach point, at which the setting of offset is released during the process of machining, and the coordinate of the present wire electrode center in the machining profile portion of the electrode path is calculated. Then, a ratio of machining energy for suppressing the formation of a recess portion in the neighborhood of the approach point is found with the machining energy inputting table 14, and a parameter is changed so that machining energy can be reduced at a predetermined ratio with respect to the machining electric power supply means 11.

Figures 2, 3:
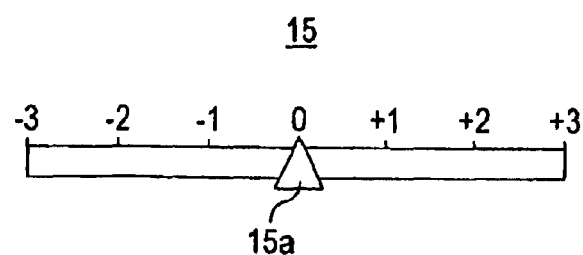
FIG. 2 is a schematic illustration showing an example of the profile directing means.
FIG. 3 is a schematic illustration showing an example of the machining energy adjusting coefficient conversion table.

FIG. 2 is a schematic illustration showing an example of the profile directing means 15. FIG. 2 shows a case in which a slide bar is used. This slide bar is displayed on a display means such as CRT not shown in the drawing, and the indicating section 15a is moved to the right and left by drugging operation conducted by, for example, a mouse. In this way, an operator can direct the degree of adjusting machining energy. An indication value indicated by the indicating section 15a is sent to the machining energy adjusting coefficient setting means 16. According to the indicating value which has been sent in this way, the machining energy adjusting coefficient setting means 16 finds machining energy adjusting coefficient H1, for example, with the machining energy adjusting coefficient conversion table 17 shown in FIG. 3, and the thus found machining energy adjusting coefficient H1 is sent to the machining energy adjusting means 13. The machining energy adjusting means 13 changes a parameter so that the machining electric power supply means 11 can output an intensity of machining energy to be outputted when the machining energy value is multiplied by machining energy adjusting coefficient H1 which has been sent from the machining energy adjusting coefficient setting means 16.

For example, in the case where the machining energy adjusting coefficient conversion table 17 shown in FIG. 3 is set, when the indicating value of the slide bar in the indicating section 15a is 0, the parameter is changed as follows. Since machining energy adjusting coefficient H1, which is sent to the machining energy adjusting means 13 by the machining energy adjusting coefficient setting means 16, is 1, the machining energy adjusting means 13 multiplies the machining energy value by a value which is obtained when a ratio of machining energy for suppressing the formation of a recess portion in the neighborhood of the approach point on the machining energy inputting ratio table 14 is multiplied by 1. That is, the machining energy value is multiplied by a ratio of machining energy for suppressing the formation of a recess in the neighborhood of an approach point on the machining energy inputting ratio table 14. In this way, the parameter is changed so that machining energy to be inputted can be outputted from the machining electric power supply means 11. Accordingly, machining energy is inputted so that the formation of a recess portion in the neighborhood of the approach point can be suppressed.

Figure 10:
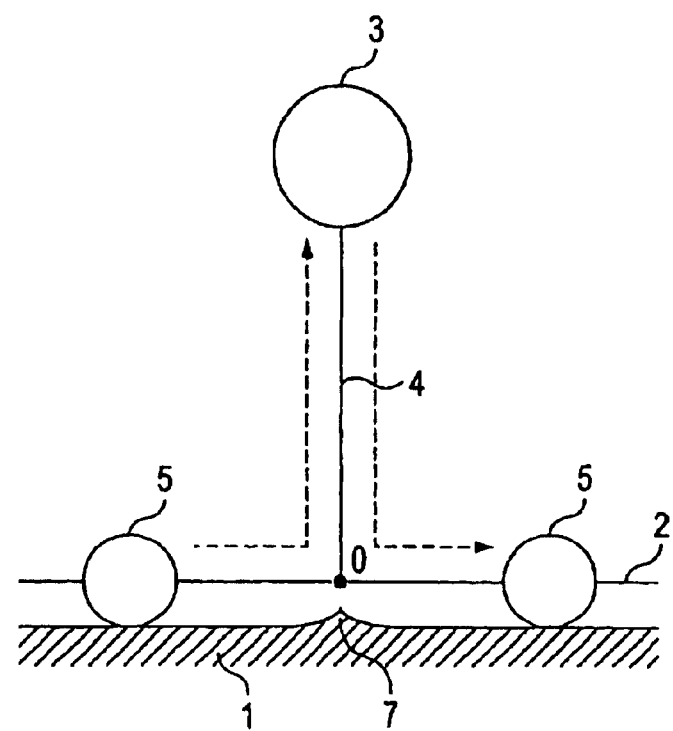
FIG. 10 is a schematic illustration showing an example in which a protruding portion is formed in the neighborhood of an approach point on a machined face of a workpiece.

In the case where an indicating value of the slide bar in the indicating section 15a is +2, since machining energy adjusting coefficient H1, which is sent by the machining energy adjusting coefficient setting means 16 to the machining energy adjusting means 13, is 0.6, the machining energy adjusting means 13 multiplies the machining energy value by a value which is obtained when a ratio of machining energy for suppressing the formation of a recess portion in the neighborhood of the approach point on the machining energy inputting ratio table 14 is further multiplied by 0.6. In this way, the parameter is changed so that machining energy to be inputted can be outputted from the machining electric power supply means 11. Accordingly, since an intensity of machining energy to be inputted is lower than an intensity of machining energy for suppressing the formation of a recess portion in the neighborhood of the approach point, a volume of machining is decreased, and a protruding profile shown in FIG. 10 is formed in the neighborhood of the approach point on the machined face of the workpiece.

Figure 7:
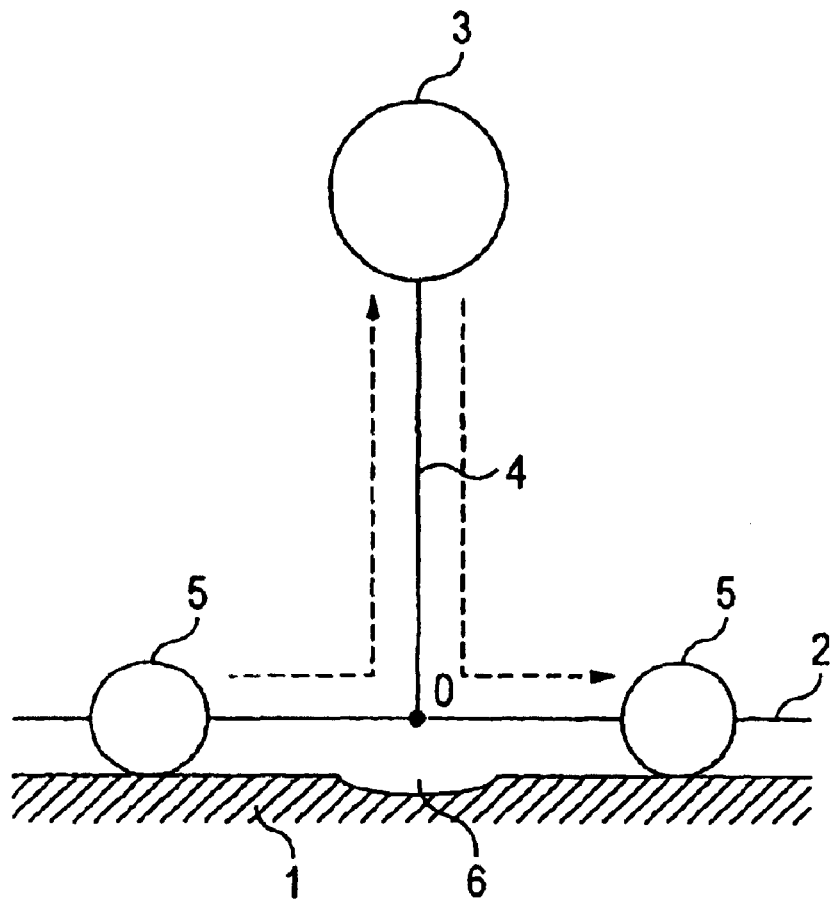
FIG. 7 is an enlarged view of a portion in the neighborhood of the approach point shown in FIG. 6.
Figure 8:
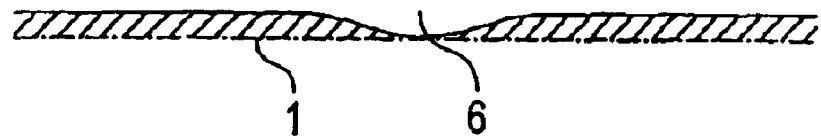
FIG. 8 is a schematic illustration showing a range in which a recess portion on a machined face of a workpiece is removed by after-machining.

In the case where an indicating value of the slide bar in the indicating section 15a is −1, since machining energy adjusting coefficient H1, which is sent by the machining energy adjusting coefficient setting means 16 to the machining energy adjusting means 13, is 1.2, the machining energy adjusting means 13 multiplies the machining energy value by a value which is obtained when a ratio of machining energy for suppressing the formation of a recess portion in the neighborhood of the approach point on the machining energy inputting ratio table 14 is further multiplied by 1.2. In this way, the parameter is changed so that machining energy to be inputted can be outputted from the machining electric power supply means 11. Accordingly, since an intensity of machining energy to be inputted is higher than an intensity of machining energy for suppressing the formation of a recess portion in the neighborhood of the approach point, a volume of machining is increased, and a recess profile shown in FIG. 7 is formed in the neighborhood of the approach point on the machined face of the workpiece.

As described above, according to the use of the workpiece, when it is intended by an operator to form a protruding profile in the neighborhood of the approach point on the machined face of the workpiece, the operator indicates a positive indicating value by the profile indicating means 15. When it is intended to form a recess profile in the neighborhood of the approach point on the machined face of the workpiece, the operator indicates a negative indicating value by the profile indicating means 15. Due to the foregoing, it is possible to adjust a profile of the portion in the neighborhood of the approach point on the machined face of the workpiece to be a desired profile.

The above explanations are made into a case in which an intensity of machining energy is adjusted by the machining energy adjusting means 13 while the machining energy inputting ratio table 14, profile indicating means 15, machining energy adjusting coefficient conversion table 17 and machining energy adjusting coefficient setting means 16 are being used. However, the following method may be adopted instead of the above method. By a table in which the machining energy inputting ratio table 14 and the machining energy adjusting coefficient table 17 are combined with each other, a machining energy adjusting coefficient corresponding to the indicating value by the profile indicating means 15 is set by the energy adjusting coefficient setting means 16, and an intensity of machining energy is adjusted by the machining energy adjusting means 13.

Embodiment 2

Figure 4:
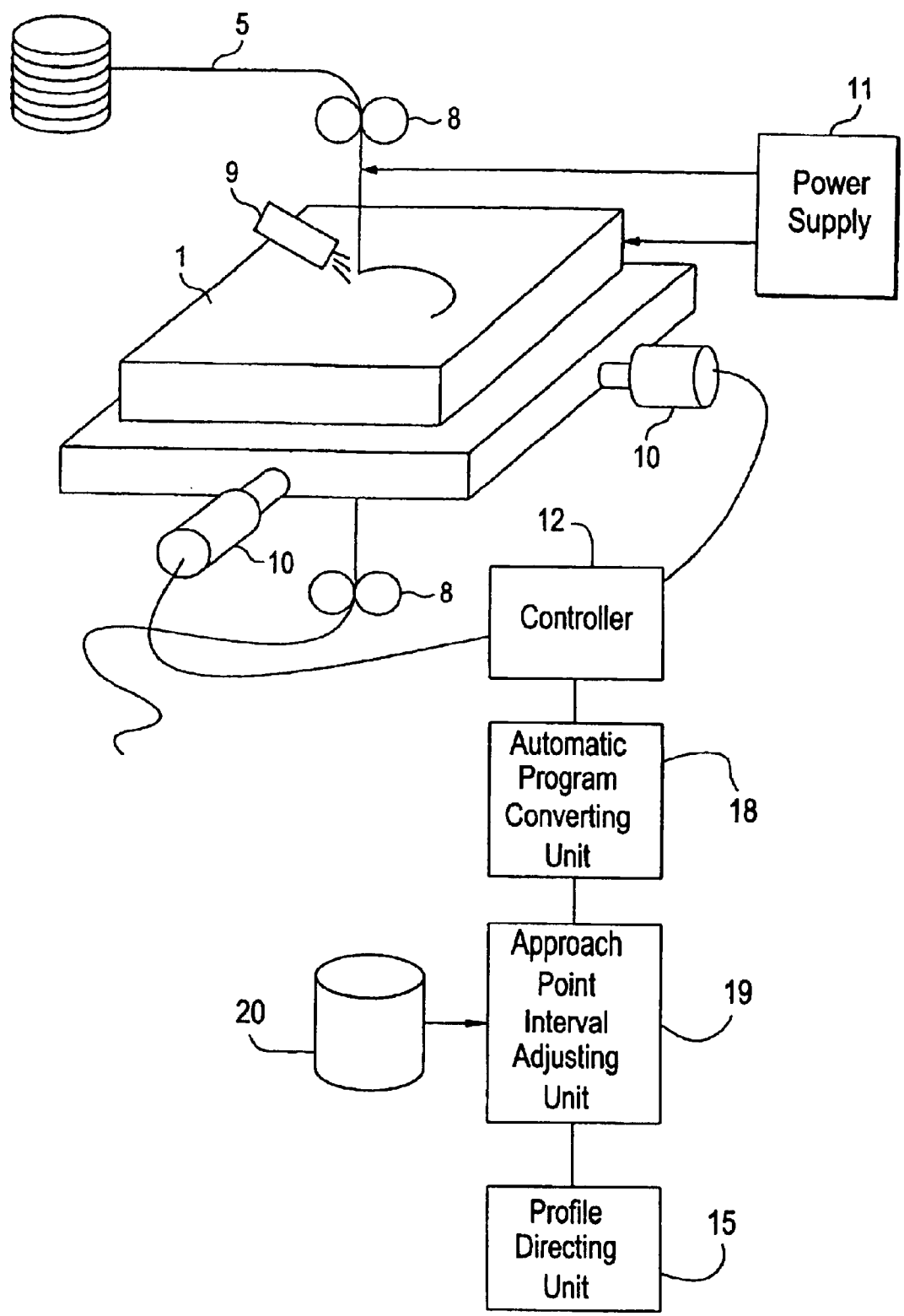
FIG. 4 is a schematic illustration showing an arrangement of a wire electric discharge machine of Embodiment 2 of the present invention.

FIG. 4 is a schematic illustration showing an arrangement of a wire electric discharge machine of Embodiment 2 of the present invention. Like reference characters are used to indicate like parts in FIG. 1 showing Embodiment 1 and FIG. 4 showing Embodiment 2. In FIG. 4, reference numeral 18 is an automatic program converting means, reference numeral 19 is an approach point interval adjusting means which is an adjusting means for adjusting a profile of a portion in the neighborhood of an approach point on a machined face of a workpiece 1 according to an indicating value by the profile indicating means 15, and reference numeral 20 is an approach point interval conversion table.

Figure 9:
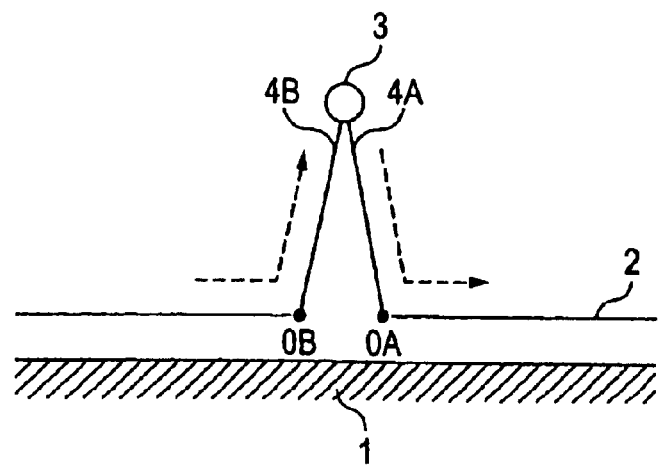
FIG. 9 is a schematic illustration showing an electrode path of the prior art in which the formation of a recess portion on a machined face of a workpiece is suppressed by changing the electrode path so that the electrode path in the profile portion between two approach points is deleted.

In the same manner as that of the wire electric discharge machine disclosed in Japanese Unexamined Patent Publication No. 4-189421, the wire electric discharge machine shown in FIG. 4 of Embodiment 2 of the present invention has a function of suppressing the formation of a recess portion on a machined face of a workpiece 1 in a portion in the neighborhood of an approach point by the electrode path shown in FIG. 9.

Figures 5, 6:
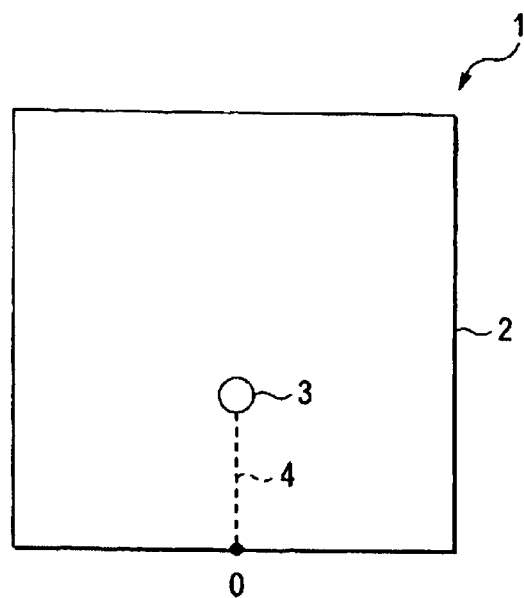
FIG. 5 is a schematic illustration showing an example of the approach point interval conversion table.
FIG. 6 is a schematic illustration showing an electrode path in the case of conducting wire electric discharge machining.

When machining is conducted as shown in FIG. 6, the automatic program conversion means 18 extracts approach point O from the program describing the electrode path accommodated in the control means 12 according to the offset setting information and grasps the approach portion 4 and the profile portion 2. Next, as shown in FIG. 9, the first approach point OA and the second approach point OB are set in the profile portion 2, and the path of the approach portion is connected with these two approach points, that is, the approach portions 4A and 4B are connected with these two approach points, and the program is changed so that the electrode path between these two approach points can be deleted, that is, a portion between the approach points OA and OB in FIG. 9 can be deleted, and the thus changed program is accommodated in the control means 12 again.

That is, when the electrode path in the neighborhood of the approach point has become an electrode path shown in FIGS. 6 and 7, the electrode path is changed as shown in FIG. 9. The control means 12 drives the drive means 10, and the wire electrode 5 and the workpiece 1 are relatively moved from each other along the thus changed electrode path.

As described above, by the automatic program conversion means 18, there are provided a first approach point OA at which the wire electrode 5 passes when it enters the profile portion 2 from the approach portion 4A with respect to the electrode path program and a second approach point OB at which the wire electrode 5 passes when it returns from the profile portion 2 to the approach portion 4B, and the program is changed so that the wire electrode 5 can not pass through the profile portion between these two approach points. Due to the foregoing, the formation of a recess portion on the machined face of the workpiece 1 can be suppressed.

In the case where the same slide bar as that of Embodiment 1 shown in FIG. 2 is used as the profile indicating means 15, an indicating value indicated by the indicating section 15a is sent to the approach point interval adjusting means 19. According to the thus sent indicating value, the approach point interval adjusting means 19 uses, for example, the approach point interval conversion table 20 shown in FIG. 5 and finds approach point interval adjusting coefficient H2, and the thus found approach point interval adjusting coefficient H2 is sent to the automatic program conversion means 18.

For example, in the case where the approach point interval conversion table 20 shown in FIG. 5 is set, when the indicating value of the slide bar of the indicating section 15a is 0, approach point interval adjusting coefficient H2, which is sent to the automatic program conversion means 18 by the approach point interval adjusting means 19, is 1. Therefore, the approach point interval is not adjusted by the automatic program conversion means 18, and the approach point interval to suppress the formation of a recess portion in the neighborhood of the approach point is set and machining is conducted on the workpiece.

In the case where the indicating value of the slide bar of the indicating section 15a is +2, approach point interval adjusting coefficient H2, which is sent to the automatic program conversion means 18 by the approach point interval adjusting means 19, is 1.4. Therefore, the approach interval which is set by the automatic program conversion means 18 is extended by 1.4 times and machining is conducted. Accordingly, since this approach point interval is longer than the approach point interval to suppress the formation of a recess portion in the neighborhood of the approach point, the machining volume is decreased and the protruding profile shown in FIG. 10 is formed in the neighborhood of the approach point on the machined face of the workpiece.

In the case where the indicating value of the slide bar of the indicating section 15a is −1, approach point interval adjusting coefficient H2, which is sent to the automatic program conversion means 18 by the approach point interval adjusting means 19, is 0.8. Therefore, the approach interval which is set by the automatic program conversion means 18 is extended by 0.8 time and machining is conducted. Accordingly, since this approach point interval is shorter than the approach point interval to suppress the formation of a recess portion in the neighborhood of the approach point, the machining volume is increased and the recess profile shown in FIG. 7 is formed in the neighborhood of the approach point on the machined face of the workpiece.

As described above, when an operator wants to form a protruding profile in the neighborhood of the approach point on the machined face of the workpiece by the profile indicating means 15 according to the use of the workpiece, the operator indicates a positive indicating value. When an operator wants to form a recess profile in the neighborhood of the approach point on the machined face of the workpiece by the profile indicating means 15 according to the use of the workpiece, the operator indicates a negative indicating value. In this way, the profile of a portion in the neighborhood of the approach point on the machined face of the workpiece can be adjusted to a desired profile.

The above explanations are made into a case in which a slide bar displayed on a display means such as CRT is used as the profile indicating means 15, however, a mechanically composed slide bar may be used. Alternatively, the profile indicating means 15 may be composed of a mechanical switch, volume or touch panel. Further, the profile indicating means 15 may be composed in such a manner that a profile of a portion in the neighborhood of the approach point on the machined face of the workpiece is adjusted by the numerical inputting.

Further, the profile indicating means 15 may be composed of NC program codes, and a profile of a portion in the neighborhood of the approach point on the machined face of the workpiece may be adjusted according to an indicating value indicated by these NC program codes.

A profile of the machined face of the workpiece corresponding to the indicating value of the profile indicating means 15 can be displayed on a display means such as CRT by a two-dimensional or three-dimensional profile. Due to the above structure, the operator can easily recognize an indicating value and a profile of the machined face of the workpiece after the completion of machining corresponding to this indicating value. Therefore, the operator can easily set a desired profile.

INDUSTRIAL APPLICABILITY

As described above, the wire electric discharge machine of the present invention is appropriately used for wire electric discharge machining.

What is claimed is:

1. A wire electric discharge machine in which a wire electrode and workpiece are relatively moved by a drive means and energy for machining is supplied between the wire electrode and workpiece by a machining electric power supply means so that the workpiece is machined by electric discharge, the wire electric discharge machine comprising:
   a profile directing means for directing a profile of a portion in a neighborhood of an approach point, which connects an approach path portion with a machining profile portion of a relative movement path on a machined face of the workpiece, to be a desirable profile such as a protruding profile or recess profile according to the use of the workpiece; and
   an adjusting means for adjusting the profile of the portion in the neighborhood of the approach point according to a direction value directed by the profile directing means.

2. A wire electric discharge machine according to claim 1, wherein the adjusting means is a machining energy adjusting coefficient setting means for increasing and decreasing energy for machining.

3. A wire electric discharge machine in which a wire electrode and workpiece are relatively moved by a drive means and energy for machining is supplied between the wire electrode and workpiece by a machining electric power supply means so that the workpiece is machined by electric discharge, the wire electric discharge machine comprising:
   a machining energy adjusting means for suppressing a formation of a recess portion in a neighborhood of an approach point on a machined face of the workpiece by reducing an intensity of machining energy per unit moving distance of the wire electrode when a distance between the approach point, at which an approach path portion and a machining profile portion of an electrode path are connected with each other, and a center of the wire electrode in the machining profile portion is in a range in which a machining volume of the workpiece per unit moving distance of the wire electrode is decreased;
   a profile directing means for directing a profile of a portion in the neighborhood of the approach point on the machined face of the workpiece so that it can be a desirable profile such as a protruding profile or recess profile according to the use of the workpiece; and
   a machining energy adjusting coefficient setting means for adjusting the profile of the portion in the neighborhood of the approach point on the machined face of the workpiece according to a direction value directed by the profile directing means, wherein
      when a machining energy setting value of the machining energy adjusting means for suppressing the formation of the recess portion in the neighborhood of the approach point on the machined face of the workpiece is increased and decreased by the machining energy adjusting coefficient setting means, a desired protruding profile or recess profile is formed in the portion in the neighborhood of the approach point on the machined face of the workpiece.

4. A wire electric discharge machine in which a wire electrode and workpiece are relatively moved by a drive means, and a first approach point and a second approach point are set to connect approach path portions with a machining profile portion of the relative moving path, respectively, the wire electric discharge machine comprising:
   a profile directing means for directing a profile of a portion in the neighborhood of the approach points to be a desirable profile such as a protruding profile or recess profile according to the use of the workpiece; and
   an approach point interval adjusting means for adjusting an interval between the first approach point and the second approach point according to a direction value given by the profile directing means.

5. A wire electric discharge machine in which a wire electrode and workpiece are relatively moved by a drive section and energy for machining is supplied between the wire electrode and workpiece by a machining electric power supply section so that the workpiece is machined by electric discharge, the wire electric discharge machine comprising:
   a profile directing section for directing a profile of a portion in a neighborhood of an approach point, which connects an approach path portion with a machining profile portion of a relative movement path on a machined face of the workpiece, to be a desirable profile such as a protruding profile or recess profile according to the use of the workpiece; and an adjusting section for adjusting the profile of the portion in the neighborhood of the approach point according to a direction value directed by the profile directing section.

6. A wire electric discharge machine according to claim 5, wherein the adjusting section is a machining energy adjusting coefficient setting section for increasing and decreasing energy for machining.

7. A wire electric discharge machine in which a wire electrode and workpiece are relatively moved by a drive section and energy for machining is supplied between the wire electrode and workpiece by a machining electric power supply section so that the workpiece is machined by electric discharge, the wire electric discharge machine comprising:

a machining energy adjusting section for suppressing a formation of a recess portion in a neighborhood of an approach point on a machined face of the workpiece by reducing an intensity of machining energy per unit moving distance of the wire electrode when a distance between the approach point, at which an approach path portion and a machining profile portion of an electrode path are connected with each other, and a center of the wire electrode in the machining profile portion is in a range in which a machining volume of the workpiece per unit moving distance of the wire electrode is decreased;

a profile directing section for directing a profile of a portion in the neighborhood of the approach point on the machined face of the workpiece so that it can be a desirable profile such as a protruding profile or recess profile according to the use of the workpiece; and a machining energy adjusting coefficient setting section for adjusting the profile of the portion in the neighborhood of the approach point on the machined face of the workpiece according to a direction value directed by the profile directing section, wherein when a machining energy setting value of the machining energy adjusting section for suppressing the formation of the recess portion in the neighborhood of the approach point on the machined face of the workpiece is increased and decreased by the machining energy adjusting coefficient setting section, a desired protruding profile or recess profile is formed in the portion in the neighborhood of the approach point on the machined face of the workpiece.

8. A wire electric discharge machine in which a wire electrode and workpiece are relatively moved by a drive section and a first approach point and a second approach point are set to connect approach path portions with a machining profile portion of the relative moving path, respectively, the wire electric discharge machine comprising:

a profile directing section for directing a profile of a portion in the neighborhood of the approach points to be a desirable profile such as a protruding profile or recess profile according to the use of the workpiece; and an approach point interval adjusting section for adjusting an interval between the first approach point and the second approach point according to a direction value given by the profile directing section.

* * * * *